(12) United States Patent
Sahu et al.

(10) Patent No.: US 12,122,956 B1
(45) Date of Patent: Oct. 22, 2024

(54) MATERIALS AND METHOD FOR DIVERTER FRACTURING

(71) Applicant: SAUDI ARABIAN OIL COMPANY, Dhahran (SA)

(72) Inventors: Qasim Sahu, Thuwal (SA); Ameerah M. Bokhari, Thuwal (SA); Rajendra Arunkumar Kalgaonkar, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 18/192,327

(22) Filed: Mar. 29, 2023

(51) Int. Cl.
  *E21B 43/26* (2006.01)
  *C09K 8/42* (2006.01)
  *C09K 8/44* (2006.01)

(52) U.S. Cl.
  CPC ........... *C09K 8/426* (2013.01); *C09K 8/44* (2013.01); *E21B 43/26* (2013.01)

(58) Field of Classification Search
  CPC ...... E21B 43/26; E21B 43/261; E21B 43/267; C09K 8/426; C09K 8/44; C09K 8/62; C09K 8/70; C09K 8/80
  See application file for complete search history.

(56) References Cited

U.S. PATENT DOCUMENTS

| 2007/0131424 | A1* | 6/2007 | Fripp | E21B 43/267 507/924 |
| 2015/0041132 | A1 | 2/2015 | Nelson et al. | |
| 2016/0244654 | A1* | 8/2016 | Way | C09K 8/035 |
| 2017/0051599 | A1 | 2/2017 | Bestaoui-Spurr et al. | |
| 2017/0253788 | A1* | 9/2017 | Ivanov | E21B 33/13 |
| 2023/0323187 | A1* | 10/2023 | Christanti | C09K 8/426 166/285 |

FOREIGN PATENT DOCUMENTS

| CN | 109184617 A * | 1/2019 | .......... B01F 15/0288 |
| WO | 2008050286 A1 | 5/2008 | |
| WO | 2013081727 A1 | 6/2013 | |
| WO | 2014065975 A1 | 5/2014 | |
| WO | 2016056934 A1 | 4/2016 | |

OTHER PUBLICATIONS

Platnieks, O. et al. "Bio-based poly (butylene succinate): Recent progress, challenges and future opportunities" European Polymer Journal 161 2021 110855 (24 pages).

(Continued)

*Primary Examiner* — Matthew R Buck
(74) *Attorney, Agent, or Firm* — Osha Bergman Watanabe & Burton LLP

(57) ABSTRACT

In a method for diverter fracturing, a water-based fracturing fluid including non-convex particles is introduced into a hydraulic fracture of a wellbore at a first location. Each non-convex particle is formed to interlock with another non-convex particle. A diverter plug is formed in the hydraulic fracture when multiple non-convex particles interlock. Flow of another water-based fracturing fluid is diverted to a second location due to the diverter plug, forming another hydraulic fracture at the second location.

18 Claims, 4 Drawing Sheets

(56) References Cited

OTHER PUBLICATIONS

Yuan, L. et al., "Experimental and numerical investigation on particle diverters transport during hydraulic fracturing" Journal of Natural Gas Science and Engineering 96 2021 104290 (11 pages).

Xia, S. et al. "Application of Polysaccharide Biopolymer in Petroleum Recovery" Polymers 2020, 12, 1860 (36 pages).

Pu, W. et al. "A comprehensive review of polysaccharide biopolymers for enhanced oil recovery (EOR) from flask to field" Journal of Industrial and Engineering Chemistry 61 2018 1-11 (11 pages).

Zhou, H. et al. "A review on mechanism and adaptive materials of temporary plugging agent for chemical diverting fracturing" Journal of Petroleum Science and Engineering 212 2022 110256 (12 pages).

Santos, L. et al. "Expandable Diverting Agents to Improve Efficiency of Refracturing Treatments" Unconventional Resources Technology Conference 2017 (9 pages).

Gomari, K. E. et al. "Application of Water-Soluble Polymer/Biopolymer Combined with a Biosurfactant in Oil-Wet Fractured Carbonate Reservoirs" ACS Omega 2021, 6, 15674-15685 (12 pages).

Di Lorenzo, M. L. et al. "Polyamide 11/Poly(butylene succinate) Bio-Based Polymer Blends" Materials 2019, 12, 2833 (14 pages).

Gomma, A. M. et al. "Engineering solid particulate diverter to control fracture complexity: experimental study" SPE-179144-MS 2016 (19 pages).

Chunming, X. et al. "High efficiency reservoir stimulation based on temporary plugging and diverting for deep reservoirs" Petrol. Explor. Develop., 2018, 45(5): 948-954 (7 pages).

* cited by examiner

MATERIALS AND METHOD FOR DIVERTER FRACTURING

BACKGROUND

Fracturing is a proven method for increasing oil recovery from tight/unconventional subsurface resources, which will not flow neutrally because of extremely low hydraulic permeability. Hence, hydraulic fracturing is a type of stimulation treatment that enhances permeability. The hydraulic fracturing treatment may involve injecting multiple fluids in a single pumping operation at the target reservoir. Pumping is performed at a pressure higher than the rock fracturing pressure, which aids in initiating and propagating a fracture in the targeted formation.

Proppant, solid particles, or acid may be used to keep the fracture open after the treatment is completed. A common method for performing hydraulic fracturing is through plug and perf completion. With this technique, a well is equipped with a cased hole completion. Perforation is used to connect the reservoir with the well. Subsequently, fractures will initiate and propagate from the perforated interval. Additionally, the method uses a mechanical plug to isolate the different stages. This process is repeated until the required number of stages is achieved. However, hydrocarbon reservoirs exhibit high heterogeneity in lithology, permeability variation, and stress regime. The heterogeneity lowers the treatment efficiency and reduces the area suitable for stimulation. This reduction may significantly decrease the ultimate production.

A chemical-based and/or mechanical flow diverter is typically used to maximize fracturing efficiency. A diverter serves to divert flow of a treatment fluid in order to focus treatment on specific areas of a well. A mechanical flow diverter is a physical barrier that focuses treatment in a certain area. A chemical-based flow diverter creates a temporary blocking effect that is cleaned up following the treatment. Particulate diverters are one type of a chemical-based diverter. The particulates are generally spherical and are pumped with the fracturing fluid. The particulates bridge across the existing hydraulic fracture, clog existing channels, and divert the treatment fluid to new, unstimulated perforation clusters with lower permeability and a higher stress regime. Thus, a new set of hydraulic fractures is generated.

Although particulate diverters tend to show favorable performance in increasing the stimulation coverage, spherical particulates exhibit tangent particle-to-particle interactions, which reduce the efficiency of bridging and plugging.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a method for diverter fracturing. A first water-based fracturing fluid having a plurality of non-convex particles suspended therein is introduced into a first hydraulic fracture of a wellbore at a first location. Each non-convex particle is formed to interlock with another non-convex particle. A diverter plug is formed in the first hydraulic fracture with two or more interlocking non-convex particles. Flow of a second water-based fracturing fluid is diverted to a second location due to the diverter plug. A second hydraulic fracture is formed at the second location.

In another aspect, each non-convex particle is formed as a three-dimensional (3D) cross particle.

In another aspect, each 3D cross particle comprises a plurality of protrusions extending from a center of the 3D cross particle.

In another aspect, each 3D cross particle comprises six protrusions.

In another aspect, an adhesive polymer is applied to a surface of one or more of the plurality of non-convex particles to enhance interlocking of two or more non-convex particles.

In another aspect, the adhesive polymer is a polypropylene or a polyamide.

In another aspect, an adhesive polymer is introduced into the wellbore to enhance interlocking of two or more non-convex particles.

In another aspect, the adhesive polymer is introduced into the wellbore following introduction of the first water-based fracturing fluid.

In another aspect, each non-convex particle is formed of a water-soluble material.

In another aspect, each non-convex particle is formed of a degradable material.

In another aspect, each non-convex particle is formed from a bio-based polymer.

In another aspect, the bio-based polymer is one of a polylactic acid (PLA), a hydroxyethyl cellulose (HEC), a hydroxypropyl methylcellulose (HPMC), a carboxymethyl cellulose (CMC), a polyanhydride, a polyglycolic acid (PGA), or a polycaprolactone (PCL).

In another aspect, each non-convex particle is formed from a blend of at least one biodegradable polymer and at least one synthetic thermoplastic polymer.

In another aspect, the blend comprises at least two of a polysaccharide, a schizophyllan, a scleroglucan, a xanthan gum, a guar gum, a hydroxypropyl guar (HPG), a carboxymethyl hydroxypropyl guar (CMHPG), a polyamide 11, a bio-polyethylene terephthalate, a polyfuranoate, a polytrimethylene terephthalate, a polybutylene succinate, and a bio-polylactic acid.

In one aspect, embodiments disclosed herein relate to a diverter particle comprising a non-convex three-dimensional (3D) cross particle comprising a plurality of protrusions extending from a center of the non-convex 3D cross particle. Each non-convex 3D cross particle is formed to interlock with another non-convex 3D cross particle.

Other aspects and advantages of the claimed subject matter will be apparent from the following description and the appended claims.

DETAILED DESCRIPTION

In one aspect, embodiments disclosed herein relate to a method and materials for diverter fracturing, which does not damage the reservoir.

In another aspect, non-convex particles are used to enhance in situ near-wellbore and deep diversion. Convex refers to a curvature that extends outwards, whereas non-convex refers to a curvature that extends inward. In a convex object, such as a spherical particle, for every pair of points lying in the object, every point on a straight line that joins the points falls within the object. If a line segment connecting two points falls outside the object, the object is considered non-convex. In one or more embodiments, the non-convex particles are shaped as three-dimensional (3D) crosses.

Figure 1A:
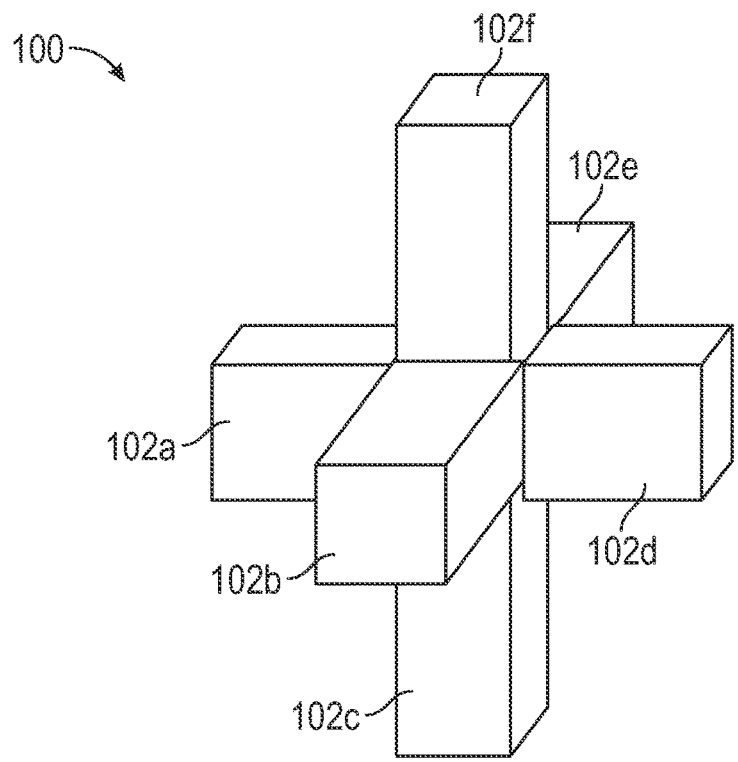
FIG. 1A is an illustration of a three-dimensional (3D) non-convex particle according to embodiments of the present disclosure.
Figure 1B:
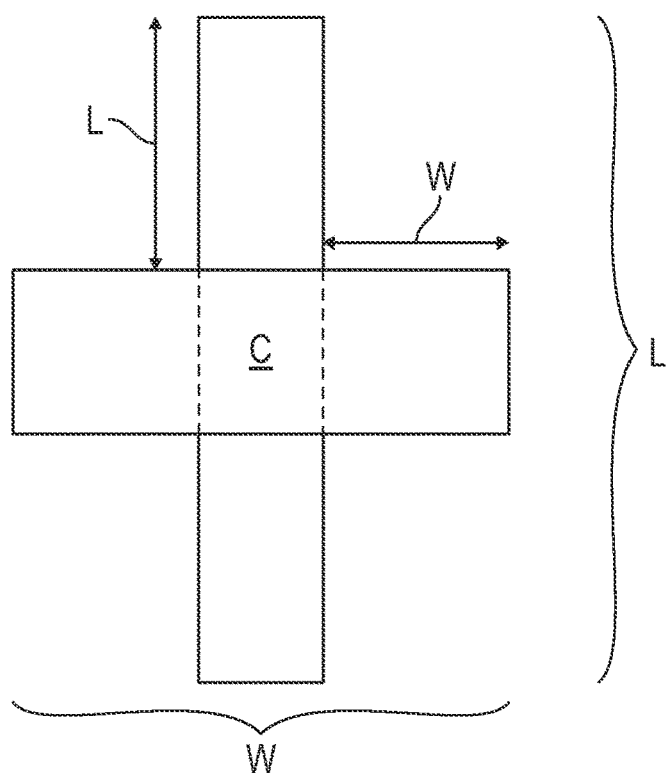
FIG. 1B is an illustration of a schematic of the dimensions of the 3D non-convex particles according to embodiments of the present disclosure.

FIG. 1A illustrates an embodiment of a 3D cross particle 100. The 3D cross particle includes multiple protrusions extending from a center (c) of the 3D cross particle 100. The embodiment depicted in FIG. 1A comprises six protrusions 102a-102f. As shown in FIG. 1B, each protrusion has a length (l) and a width (w). Additionally, the entire particle has a length (L) and a width (W). The length (L) and width (W) of the 3D cross particle 100, as well as the length (l) and width (w) of the protrusions, may be selected and manufactured for a customized treatment. For instance, the dimensions of the 3D cross particle must be less than a fracture width, such as between 0.05 inches and 0.3 inches. Thus, the length (L) of the particles may be between 0.05 inches and 0.3 inches, and the width (W) of the particles may be between 0.05 inches and 0.3 inches. While the non-convex particle is shaped as a three-dimensional cross in FIG. 1A, it will be understood that other configurations are contemplated.

In one or more embodiments, the interlocking geometry of the 3D cross particles is an approximate 90-degree configuration between protrusions. However, other configurations are possible provided that the interlocking mechanism and bridging of the particles inside a fracture effectively plugs the fracture. For instance, particles having a start structure may also be utilized.

Materials

In one or more embodiments, the 3D non-convex particles are formed from a degradable material. As the temperature of the fracturing fluid carrying the 3D non-convex particles increases, the particles degrade over time in the water-based fracturing fluids. The degradation of the 3D non-convex particles enables easy flowback after concluding the fracturing treatment, causing no damage to the formation.

Materials that may be utilized in forming the non-convex particles are bio-based polymers that are thermally stable and degradable over time by high temperatures or enzymes without causing negative impacts on the formation or the environment. These biopolymers may be synthesized from natural and renewable resources, such as cellulose-based polymers, which may include hydroxyethyl cellulose (HEC), hydroxypropyl methylcellulose (HPMC), carboxymethyl cellulose (CMC), polyanhydrides, polyglycolic acid (PGA), and polycaprolactone (PCL).

In one or more embodiments, the 3D non-convex particles are formed of polylactic acid (PLA). PLA is a thermoplastic polyester that is water-soluble at reservoir temperature range; thus, PLA will degrade over time within the formation. PLA is one possible material that can be used for the particles. Other materials can be utilized in this invention are bio-based polymers that are thermal stable and degradable over time by high temperatures or enzymes without causing negative impacts on the formation or the environment. Table 1 lists exemplary values for properties of an exemplary PLA that can used to form the particles.

TABLE 1

| Exemplary Values for Properties of PLA | |
| --- | --- |
| Property | PLA |
| Density [g/cm³] | 1.21-1.43 |
| Tensile Strength [MPa] | 21-60 |
| Elastic Modulus [MPa] | 0.35-0.5 |
| Melting Temperature [° C.] | 150-162 |

In some embodiments, a blend of biodegradable polymers and synthetic thermoplastic polymers is used to form the non-convex particles. Blending biodegradable polymers with synthetic thermoplastic polymers has the potential to provide renewable, degradable, and cost-effective materials. Polymer blends may include polysaccharides, such as schizophyllan, scleroglucan, xanthan gum, and guar gum and its derivatives, such as hydroxypropyl guar (HPG), and carboxymethyl hydroxypropyl guar (CMHPG). Non-limiting examples of thermoplastic biopolymers that may be utilized include polyamide 11, bio-polyethylene terephthalate and polyfuranoates, polytrimethylene terephthalate, polybutylene succinate, and bio-polylactic acid. Alternatively, polyimides may be used as a material for the 3D non-convex particles. Tables 2-6 list example values for materials for forming the non-convex particles according to embodiments of this disclosure. Table 4 provides additional exemplary values for properties of PLA since the listed properties are a function of temperature.

TABLE 2

| Exemplary Values for Properties of PGA | |
| --- | --- |
| Property | PGA |
| Density [g/cm³] | 1.53 |
| Tensile Strength [MPa] | 60 |
| Elastic Modulus [MPa] | 6000 |
| Melting Temperature [C.] | 225-230 |

TABLE 3

| Exemplary Values for Properties of PCL | |
| --- | --- |
| Property | PCL |
| Density [g/cm³] | 1.145 |
| Tensile Strength [MPa] | 10.5-16.1 |
| Elastic Modulus [MPa] | 343.9-364.3 |
| Melting Temperature [C.] | 60 |

TABLE 4

Exemplary Values for Properties of PLA

| Property | PLA |
|---|---|
| Density [g/cm$^3$] | 1.21-1.43 |
| Tensile Strength [MPa] | 32.938 |
| Elastic Modulus [MPa] | 26.082 |
| Melting Temperature [C]. | 170-180 |

TABLE 5

Exemplary Values for Properties of Bio-Polyethylene Terephthalate

| Property | Bio-Polyethylene Terephthalate |
|---|---|
| Density [g/cm$^3$] | 1.3-1.4 |
| Tensile Strength [MPa] | 50.7 |
| Elastic Modulus [MPa] | 364 |
| Melting Temperature [C.] | 246 |

TABLE 6

Exemplary Values for Properties of Bio-Polytrimethylene Terephthalate

| Property | Bio-Polytrimethylene Terephthalate |
|---|---|
| Density [g/cm$^3$] | 1.38 |
| Tensile Strength [MPa] | 60 |
| Elastic Modulus [MPa] | 2.4 GPa |
| Melting Temperature [C.] | 250-260 |

For treatment, first a fracturing fluid, such as a polymer-based fracturing fluid, may be injected downhole to initiate and propagate a fracture in a subsurface reservoir. Once a fracture is generated, the particles may be injected downhole at a concentration that ranges, but is not limited to, from about 0.5 to about 2 pounds of particles per gallon of fracturing fluid. The treatment comprising the 3D non-convex particles described herein dispersed in a water-based fracturing fluid may be injected downhole as a single pill in the same pumping stage. The particles may be mixed with the fracturing fluids at the surface. The fracturing fluid is viscous and has the ability to suspend the particles within the fracturing fluid.

Figure 2:
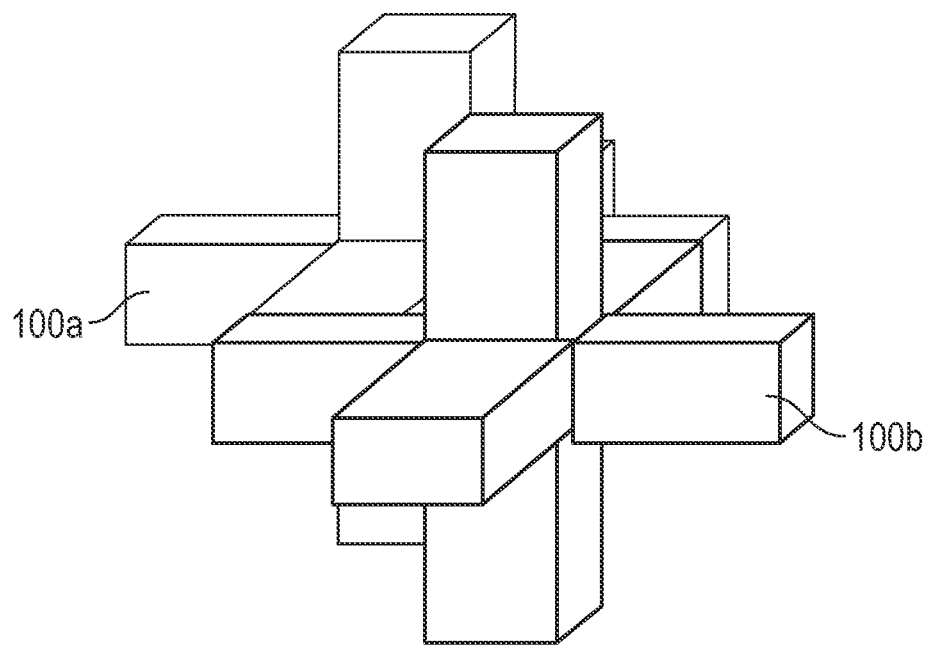
FIG. 2 is an illustration of a particle-to-particle interaction between 3D non-convex particles according to embodiments of the present disclosure.

Following injection, as the 3D non-convex particles in the fracturing fluid make physical contact with an existing hydraulic fracture, the unique geometry of the particles provides an effective particle-to-particle interaction that improves the fracture's plugging efficiency. Specifically, accumulated 3D cross particles may engage in an interlocking mechanism with one another. The interlocking of particles may reduce the conductivity of the aggregated particles, enhance bridging, and block an existing fracture. The particle-to-particle interaction of 3D cross particles 100a and 100b is shown in FIG. 2.

In some embodiments, an adhesive polymer is applied to a surface of one or more of the 3D non-convex particles to enhance the interlocking of the 3D cross particles. The adhesive polymer may be applied during the manufacturing process to the surface of one or more particles. For instance, the adhesive polymer may be sprayed on the surface of the particles prior to pumping. Alternatively, the adhesive polymer may be introduced, or injected, as a separate pill during the fracturing treatment following injection of the particle to improve the interlocking. Non-limiting examples of adhesive polymers that may be used include polypropylene and polyamides.

Method

Figure 3:
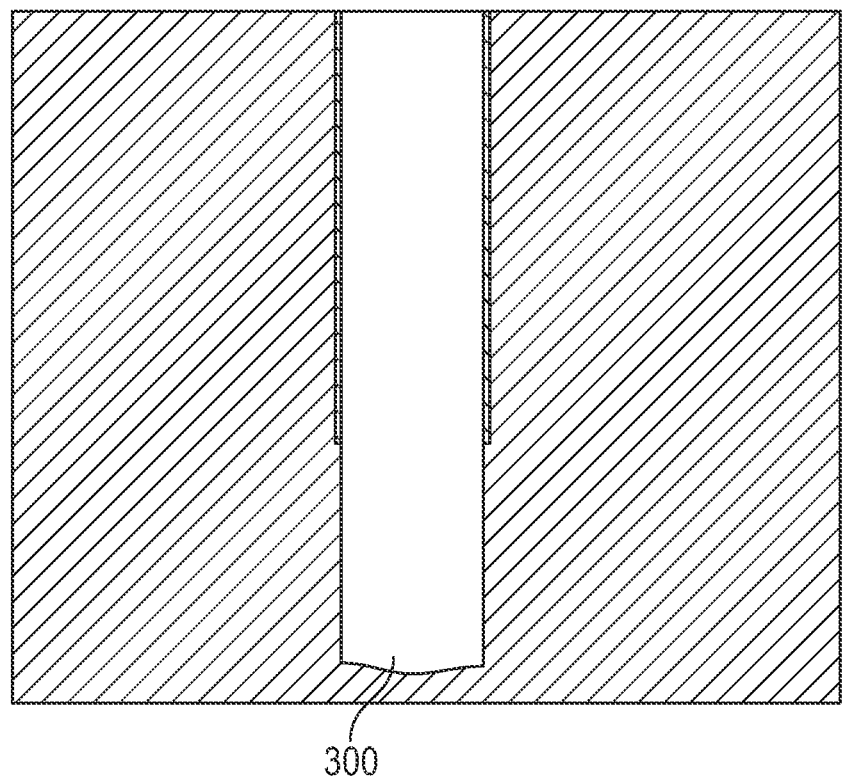
FIG. 3 is a flow diagram illustrating the method according to embodiments of the present disclosure.
Figure 4:
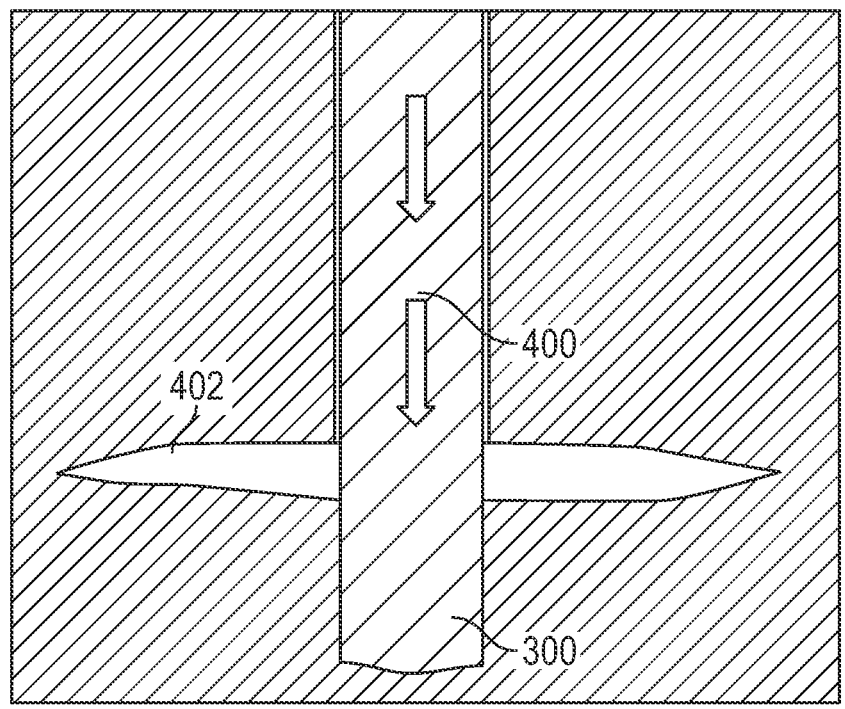
FIG. 4 is an illustration of a wellbore drilled in a target formation with no fractures present according to embodiments of the present disclosure.
Figure 5:
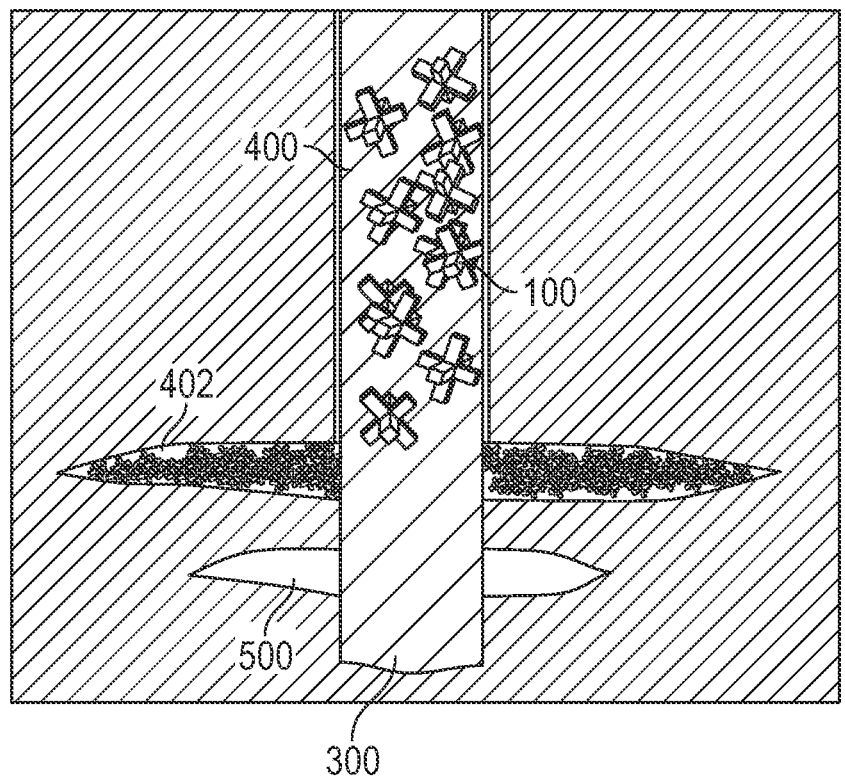
FIG. 5 is an illustration of a water-based fracturing fluid injected into a wellbore to induce new hydraulic fractures according to embodiments of the present disclosure.

Initially, when a wellbore 300 is drilled in a target formation, hydraulically induced fractures are not present, as shown in FIG. 3. A water-based fracturing fluid 400, such as a guar-based polymer or a viscoelastic surfactant, is injected into the wellbore 300 to induce new hydraulic fractures 402, as illustrated in FIG. 4. FIG. 5 depicts injection of 3D non-convex particles (e.g., 3D cross particle 100) with fracturing fluid 400 as a carrier for the particles. The fracturing fluid 400 carries the particles to the existing hydraulic fractures 402. Once the particles effectively form a diverter plug and bridge an existing hydraulic fracture 402, the fracturing fluid 400 will be diverted to a new untreated zone to induce and propagate a new fracture 500. Degradation of the particles in the fracture depends on the temperature of the reservoir being fractured. Typically, it will take between about 24 to about 48 hours for the particles to degrade.

Figure 6:
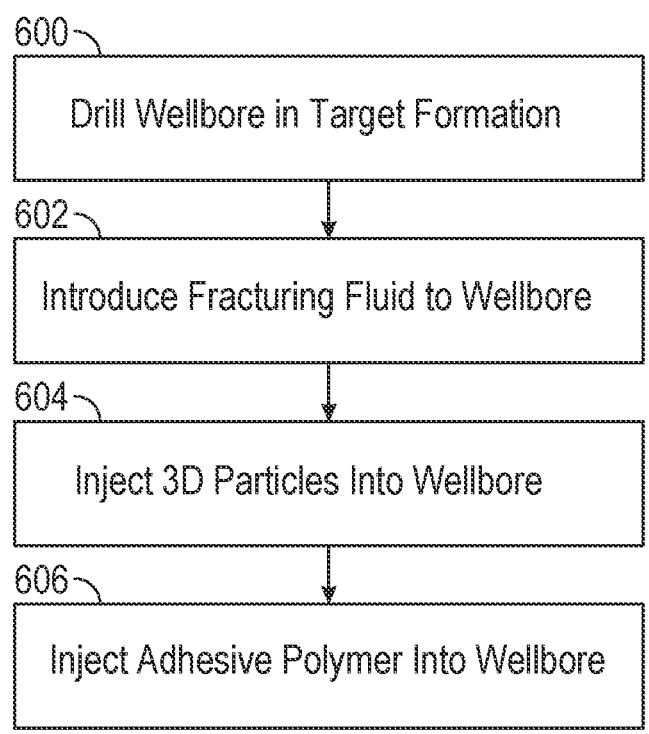
FIG. 6 is an illustration of injection of 3D non-convex particles in water-based fracturing fluid into a wellbore to plug hydraulic fractures according to embodiments of the present disclosure.

The following is a description of the method used to achieve diverter fracturing according to embodiments of the present disclosure. A flow diagram illustrating the method is shown in FIG. 6. In an initial step 600, a wellbore is drilled in a target formation. In step 602, a water-based fracturing fluid, such as a guar-based polymer or a viscoelastic surfactant, is introduced (i.e., pumped or injected) into the wellbore to induce new hydraulic fractures. The 3D non-convex particles suspended in the water-based fracturing fluid is then injected into the wellbore in step 604. The fracturing fluid carries the particles to existing hydraulic fractures at a first location. In one or more embodiments, the same fluid used to fracture the reservoir will be used as a carrier fluid for the particles. Once the particles effectively plug and bridge an existing hydraulic fracture, the fracturing fluid without particles will be diverted to a second location of an untreated zone to induce and propagate a new fracture as part of the pumping schedule. It will the same fracturing fluid, but pumped without the particles. In an optional step 606, an adhesive polymer is injected into the wellbore to enhance interlocking of the particles to one another, such as two or more interlocking non-convex particles, as described above.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:

1. A method for diverter fracturing, comprising:
   introducing a first water-based fracturing fluid having a plurality of non-convex particles suspended therein into a first hydraulic fracture of a wellbore at a first location,
   wherein each non-convex particle is formed to interlock with another non-convex particle;
   forming a diverter plug in the first hydraulic fracture with two or more interlocking non-convex particles;
   applying an adhesive polymer to a surface of one or more of the plurality of non-convex particles to enhance interlocking of two or more non-convex particles;
   diverting flow of a second water-based fracturing fluid to a second location due to the diverter plug; and forming a second hydraulic fracture at the second location.

2. The method of claim 1, wherein each non-convex particle is formed as a three-dimensional (3D) cross particle.

3. The method of claim 2, wherein each 3D cross particle comprises a plurality of protrusions extending from a center of each 3D cross particle.

4. The method of claim 3, wherein each 3D cross particle comprises six protrusions.

5. The method of claim 1, wherein the adhesive polymer is at least one of a polypropylene and a polyamide.

6. The method of claim 1, wherein the adhesive polymer is introduced into the wellbore to enhance interlocking of two or more non-convex particles.

7. The method of claim 1, wherein the adhesive polymer is introduced into the wellbore following introduction of the first water-based fracturing fluid.

8. The method of claim 1, wherein each non-convex particle is formed of a water-soluble material.

9. The method of claim 1, wherein each non-convex particle is formed of a degradable material.

10. The method of claim 1, wherein each non-convex particle is formed from a bio-based polymer.

11. The method of claim 10, wherein the bio-based polymer is one of a polylactic acid (PLA), a hydroxyethyl cellulose (HEC), a hydroxypropyl methylcellulose (HPMC), a carboxymethyl cellulose (CMC), a polyanhydride, a polyglycolic acid (PGA), or a polycaprolactone (PCL).

12. The method of claim 1, wherein each non-convex particle is formed from a blend of at least one biodegradable polymer and at least one synthetic thermoplastic polymer.

13. The method of claim 12, wherein the blend comprises at least two of a polysaccharide, a schizophyllan, a scleroglucan, a xanthan gum, a guar gum, a hydroxypropyl guar (HPG), a carboxymethyl hydroxypropyl guar (CMHPG), a polyamide 11, a bio-polyethylene terephthalate, a polyfuranoate, a polytrimethylene terephthalate, a polybutylene succinate, and a bio-polylactic acid.

14. A diverter particle, comprising:
a non-convex three-dimensional (3D) cross particle comprising a plurality of protrusions extending from a center of the non-convex 3D cross particle; and
an adhesive polymer applied to a surface of the non-convex 3D cross particle,
wherein each non-convex 3D cross particle is formed to interlock with another non-convex 3D cross particle, and wherein the adhesive polymer is applied to enhance interlocking with another non-convex 3D cross particle.

15. The diverter particle of claim 14, wherein each non-convex 3D cross particle is formed from a bio-based polymer.

16. The diverter particle of claim 15, wherein the bio-based polymer is one of a polylactic acid (PLA), a hydroxyethyl cellulose (HEC), a hydroxypropyl methylcellulose (HPMC), a carboxymethyl cellulose (CMC), a polyanhydride, a polyglycolic acid (PGA), or a polycaprolactone (PCL).

17. The diverter particle of claim 14, wherein each non-convex 3D cross particle comprises six protrusions.

18. The diverter particle of claim 14, wherein the adhesive polymer is a polypropylene or a polyamide.

* * * * *